Sept. 22, 1964 R. K. STUM 3,149,813
MIRROR SUPPORT FOR A REMOTELY CONTROLLED
REAR VIEW MIRROR MECHANISM
Filed April 16, 1963
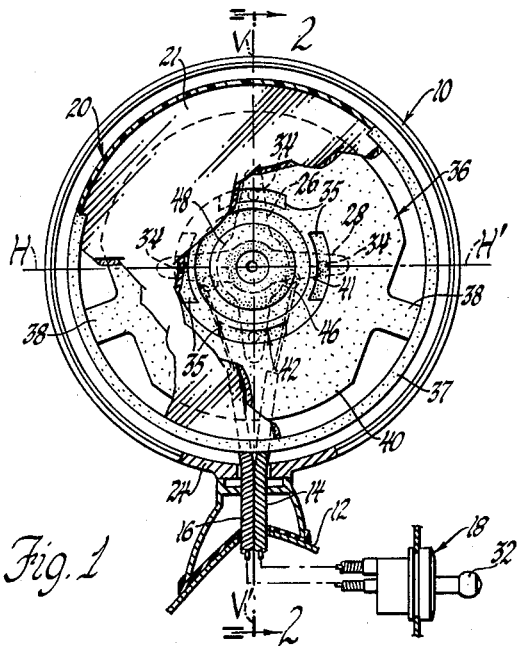
Fig. 1
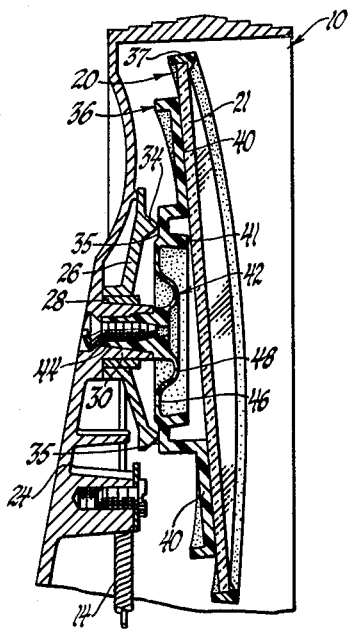
Fig. 2
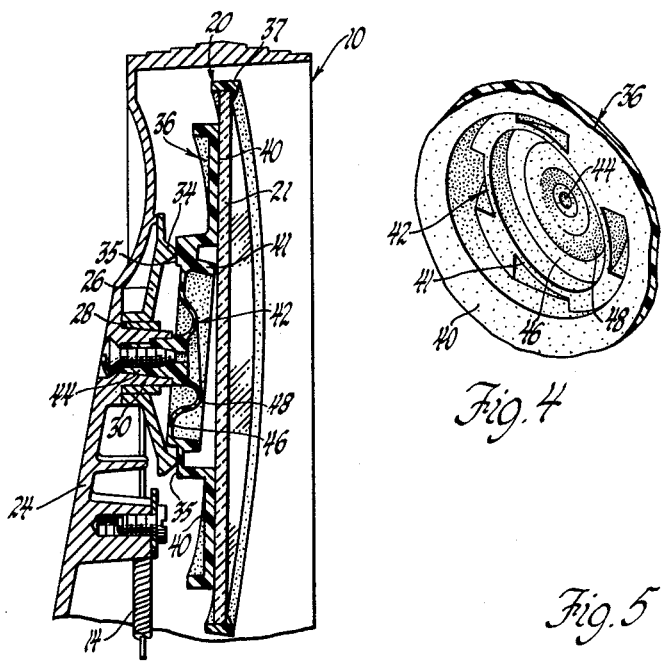
Fig. 3
Fig. 4
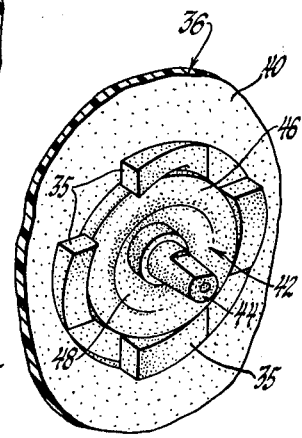
Fig. 5
INVENTOR.
Ralph K. Stum
BY
W. F. Wagner
ATTORNEY

United States Patent Office 3,149,813
Patented Sept. 22, 1964

3,149,813
MIRROR SUPPORT FOR A REMOTELY
CONTROLLED REAR VIEW MIRROR
MECHANISM
Ralph K. Stum, Anderson, Ind., assignor to General
Motors Corporation, Detroit, Mich., a corporation of
Delaware
Filed Apr. 16, 1963, Ser. No. 273,520
10 Claims. (Cl. 248—288)

This invention relates to a mirror support and, more particularly, to a mirror support construction having particular utility with a remotely controlled mirror mechanism.

In the construction of present day remotely controlled rear view mirror mechanisms, it is customary to mount the mirror support to the housing through some form of universal connection. In almost all instances, this universal connection takes the form of ball-and-socket members with one of the members being fixed to the housing while the other is secured with the mirror support. As should be apparent, a construction of this sort is expensive to manufacture and also presents problems in assembly.

Accordingly, one object of the present invention is to provide a mirror support of simple and inexpensive construction which may be readily mounted to a base housing.

Another object of the present invention is to provide a mirror support that can be connected to the housing of a remotely controlled mirror mechanism through a diaphragm-type connection and still be universally adjustable about axes substantially parallel to the mirror element.

The above and other objects are accomplished by a mirror support comprising a body portion having means formed therewith for retaining a mirror element. A mounting means is connected to the body portion through flexible means which has parts thereof supported by the mounting means and body portion to permit movement of the latter about a plurality of axes which are substantially parallel to the plane of the mirror element. The flexible means is formed as a diaphragm with the outer periphery thereof connected to the body portion while the center is secured to the mounting means.

A more complete understanding of the invention will be obtained from a study of the following detailed description taken in conjunction with the drawings in which:

FIGURE 1 shows a remotely controlled rear view mirror mechanism of a type with which the present invention can be employed;

FIGURE 2 is an enlarged sectioned view taken on line 2—2 of FIGURE 1;

FIGURE 3 is a view similar to that of FIGURE 2 with the upper portion of the mirror support tilted forwardly;

FIGURE 4 is an isometric view showing the front of the flexible connection that mounts the mirror support to the base housing of the mirror mechanism; and FIGURE 5 is a view similar to that of FIGURE 4 but illustrating the rear portion of the flexible connection.

Referring now to the drawings and specifically FIGURE 1, a rear view mirror mechanism generally indicated by the numeral 10 is shown mounted exteriorly to the outer sheet metal 12 of a vehicle door or fender. A pair of cables 14 and 16, that comprise the usual wire and sheath portion and act in tension and compression, are each mounted at one end within the mirror mechanism while the other ends are connected to an actuator generally indicated by the numeral 18. As should be apparent, the mirror mechanism illustrated is of the remotely controlled type which permits a mirror support 20 which mounts a mirror element 21 to be adjusted by the vehicle driver from within the vehicle.

A mirror mechanism similar to the above-described type can be seen in copending patent application Serial Number 273,356, filed April 16, 1963, in the names of Lloyd T. Fuqua, George C. Campbell, and Lucien W. Pryor and assigned to the assignee of this invention. Reference is made to that application for a detailed description and explanation of the operation of this device; however, for present purposes it should suffice to mention that this mechanism includes a housing or base 24 for the mirror support with adjustment of the latter being accomplished through a pair of cam support members 26 and 28 that are rotatably mounted on a boss 30 and have oppositely extending arms formed therewith. The cam support members are connected through the cables 14 and 16 to a universally supported control knob 32 so that upon pivotal movement of the latter either selective or cojoint movement of the cables is realized, which in turn, causes one or both of the cam support members to rotate about the axis of the boss 30. A cone-type projection 34, formed with each arm of the respective cam support members, engages one of four ramp portions 35 integrally formed with the rear of the mirror support. As best seen in FIGURES 1 and 5, each ramp portion is arcuate in form and located on a circle so that upon rotative movement, of, for example, the cam support member 26, the projection on one arm thereof rides up a ramp while the other projection rides down the other ramp, resulting in tilting movement of the mirror support about a horizontal axis H—H' with the upper portion of the mirror support moving forwardly as seen in FIGURE 3. Similarly when the cam support member 28 is rotated, sidewise movement of the mirror support about a vertical axis V—V' is realized. Finally, when both cam support members are rotated simultaneously, tilting movement of the mirror support occurs about an axis located in the same plane as the axes V—V' and H—H' but therebetween.

The mirror support utilized with the above-described mirror mechanism is similar to that shown in patent application Serial Number 273,357, filed April 16, 1963, in the name of Lloyd T. Fuqua. The mirror support is adapted to support the mirror element between a body porton 36 and a rim 37 that is connected with the former by a pair of radially extending arms 38. The entire mirror support is made from a readily moldable material such as plastic and the body portion 36 is of a generally circular outer form provided with a flat annular surface portion 40 which integrally connects with an axially extending ring 41 that is tapered from its widest to its narrowest point along the H—H' axis to permit the face of the mirror support to normally face the driver. The aforementioned ramps 35 are formed around the ring 41 as best viewed in FIGURE 5. A thin annular diaphragm generally indicated by the numeral 42 connects the ring of the body portion 36 with a mounting means or stud 44 that is centrally located with respect to the ramps and the marginal edge of the body portion. As best seen in FIGURE 2, the stud is accommodated by a bore in the boss 30 and is rigidly secured therein so as to retain the ramps on the mirror support in contact with the projections 34.

The diaphragm 42 is a significant feature of the mirror support 20 inasmuch as it eliminates the need for the usual ball-and-socket connection frequently employed for universally pivotally supporting a mirror support. In the preferred form, the diaphragm is integral with the body portion 36 and stud 44, and is formed from a plastic material into a thin flexible sheet. More specifically, the diaphragm comprises a radially extending base portion 46 which at one end connects to the mirror support body portion 36 at a point adjacent the ramps, while the other end leads into an outwardly ballooned or bowed portion 48 that is fixed to the stud 44. As should be apparent, the bowed portion of the diaphragm provides increased flexibility between the body portion and the stud to permit the mirror support to tilt in response to movement of the cam support members as described above. Since the diaphragm is of a relatively thin cross section, flexing action thereof easily occurs resulting in any adjustment of the mirror support which would normally be provided in this type of mechanism by the conventional ball-and-socket connection. In this particular instance, the diaphragm thickness was selected so as to provide a firm support of the mirror support with the mirror element and at the same time allow sufficient flexibility for adjustable movement of the mirror support.

It should be noted that although the mirror support made in accordance with the present invention is disclosed with a mechanism that employs camming members for adjusting the mirror, it can be used equally as well with remotely controlled mirror constructions in which the cables are directly connected to the rear of the mirror support. In other words, there are various constructions in the prior art with which the present invention can be utilized, it being understood that the particular mechanism disclosed is for illustrative purposes only. Moreover, it should be noted that by having the mirror support constructed as described above, the rigid connection of the diaphragm means with the stud and body portion of the mirror support serves to preclude any possibility of any rotative movement of the latter about the longitudinal axis of the stud. Thus, the problem of twisting and fouling of cables is eliminated in the case of mirror mechanisms where the cables are directly connected to the body portion 36 of the mirror support or, as would be the case with the cam-operated mechanism, misalignment of the camming members is alleviated.

As alluded to above, various changes and modifications can be made in the above-described mirror support without departing from the spirit of the invention. Such changes and modifications are contemplated by the inventor and he does not wish to be limited except by the scope of the appended claims.

I claim:

1. A support for universally supporting a mirror element on a base, comprising a body portion, means on said body portion for retaining the mirror element, means adapted to be fixed to said base, diaphragm means having portions thereof connected to said last-mentioned means and said body portion, said diaphragm means including a bowed portion so as to permit movement of said body portion about a plurality of axes substantially parallel to the plane of the mirror element.

2. A support for universally supporting a mirror element on a base, comprising a body portion, first means on said body portion for retaining the mirror element, second means adapted to be fixed to said base, a thin flexible member having portions connected to said second means and said body portion, said member extending radially outwardly from the second means and being formed with a portion bowed axially outwardly with respect to said second means so as to permit said body portion to be pivoted about a plurality of axes substantially parallel to the plane of the mirror element.

3. A support for universally supporting a mirror element on a base, comprising a body portion conforming in outer configuration to the mirror element, means on said body portion for retaining the mirror element in a fixed position so as to expose the reflecting surface, a stud adapted to be fixed to said base, and flexible means having portions connected to said stud and said body portion, said last-mentioned means extending radially outwardly from the stud and being formed with a bowed portion so as to permit the body portion to be pivoted about a plurality of axes substantially parallel to the plane of the mirror element.

4. A support for universally supporting a mirror element on a base, comprising a body portion, first means on said body portion for retaining the mirror element, second means adapted to be fixed to said base, and third means having a first portion and second portion respectively supported by said second means and said body portion, said third means being formed of a yieldable material and having a bowed portion so as to provide a flexing action thereof between the first and second portions during pivotal movement of the support about axes parallel to the mirror element.

5. A support for universally supporting a mirror element on a base, comprising a body portion, means on said body portion for retaining the mirror element, means adapted to be fixed to said base, and a flexible disk-type member having its central and outer portion respectively supported by said last-mentioned means and said body portion, said member having a bowed portion between said central and outer portions so as to permit pivotal movement of said body portion about a plurality of axes substantially parallel to the plane of the mirror element.

6. In combination, a base, a mirror support comprising a body portion, mounting means fixed to said base, a flexible disk-type member having its central and outer portion respectively supported by said last-mentioned means and said body portion, said member having a bowed portion between said central and outer portions so as to permit pivotal movement of said body portion about a plurality of axes substantially parallel to the plane of the mirror element, and means supported by said base and operatively associated with said body portion for positioning the latter about said axes.

7. In combination, a base, a mirror support comprising a body portion, mounting means fixed to said bracket, diaphragm means having a first and second portion respectively rigidly secured to said last-mentioned means and said body portion, said diaphragm means having a bowed portion between said first and second portions so as to permit pivotal movement of said body portion about a plurality of axes substantially parallel to the plane of the mirror element, and means supported by said base and operatively associated with said body portion for positioning the latter about said axes.

8. In combination, a base, a mirror support comprising a body portion, mounting means fixed to said base, diaphragm means having a first and second portion respectively rigidly secured to said last-mentioned means and said body portion, said diaphragm means having a bowed portion between said first and second portions so as to permit pivotal movement of said body portion about a plurality of axes substantially parallel to the plane of the mirror element, means pivotally supported by said base and engaging said body portion, and means connected to said last-mentioned means for pivoting the latter for positioning the mirror support about said axes.

9. The device of claim 8 wherein said means pivotally supported by said base comprises a pair of cam followers rotatably supported about the longitudinal axis of the mounting means, cam means formed on the rear of the body portion and engaged by said cam followers.

10. The device of claim 8 wherein said means connected to said last-mentioned means comprises a pair of cables, and a remotely located actuator secured to said cables for selectively and conjointly operating said cables.

References Cited in the file of this patent
UNITED STATES PATENTS
3,096,664    Walsh _____ July 9, 1963